(12) United States Patent  
Tibi et al.

(10) Patent No.: US 7,471,311 B2  
(45) Date of Patent: Dec. 30, 2008

(54) METHOD FOR IDENTIFYING BAD PIXEL AGAINST A NON-UNIFORM LANDSCAPE

(75) Inventors: Dov Tibi, Givat Ela (IL); Amikam Zur, Kiryat Ata (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 27 days.

(21) Appl. No.: 10/557,805

(22) PCT Filed: May 12, 2004

(86) PCT No.: PCT/IL2004/000401

§ 371 (c)(1),  
(2), (4) Date: Nov. 23, 2005

(87) PCT Pub. No.: WO2004/105396

PCT Pub. Date: Dec. 2, 2004

(65) Prior Publication Data

US 2006/0215046 A1      Sep. 28, 2006

(30) Foreign Application Priority Data

May 26, 2003    (IL)    .................................... 156124

(51) Int. Cl.  
*H04N 7/18*      (2006.01)

(52) U.S. Cl. ........................................ 348/135; 348/61  
(58) Field of Classification Search ................. 348/135, 348/61; 250/206.1; 382/132, 284; 378/98  
See application file for complete search history.

(56) References Cited

U.S. PATENT DOCUMENTS 5,798,519 A * 8/1998 Vock et al. ............... 250/206.1  
5,828,725 A * 10/1998 Levinson ...................... 378/98  
6,928,194 B2 * 8/2005 Mai et al. .................... 382/284  
7,142,705 B2 * 11/2006 Inoue et al. ................. 382/132

* cited by examiner

*Primary Examiner*—Allen Wong  
(74) *Attorney, Agent, or Firm*—Mark M. Friedman

(57) ABSTRACT

A method for identifying bad pixels in a matrix imaging sensor comprises moving the matrix sensor in a prescribed motion with respect to a background landscape (FIG. 1, 10), acquiring a combined image of the landscape, and identifying bad pixels (16) in the matrix sensor from the combined image. The identification is aided by preferably applying filtering to the combined image. The prescribed motion is preferably rotation of the sensor or translation of the sensor around a circle, and the combined image includes a plurality of preferably similar landscape images. The identification of the bad pixels is performed on-line, in real-time, without requiring the use of a black body.

17 Claims, 3 Drawing Sheets

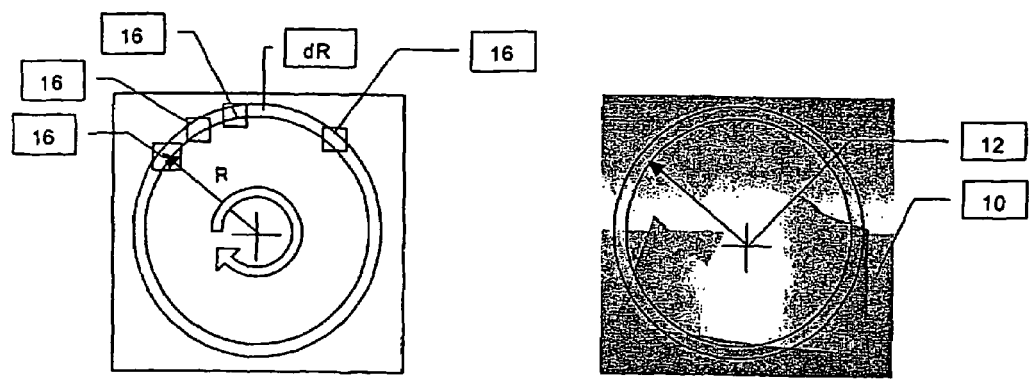
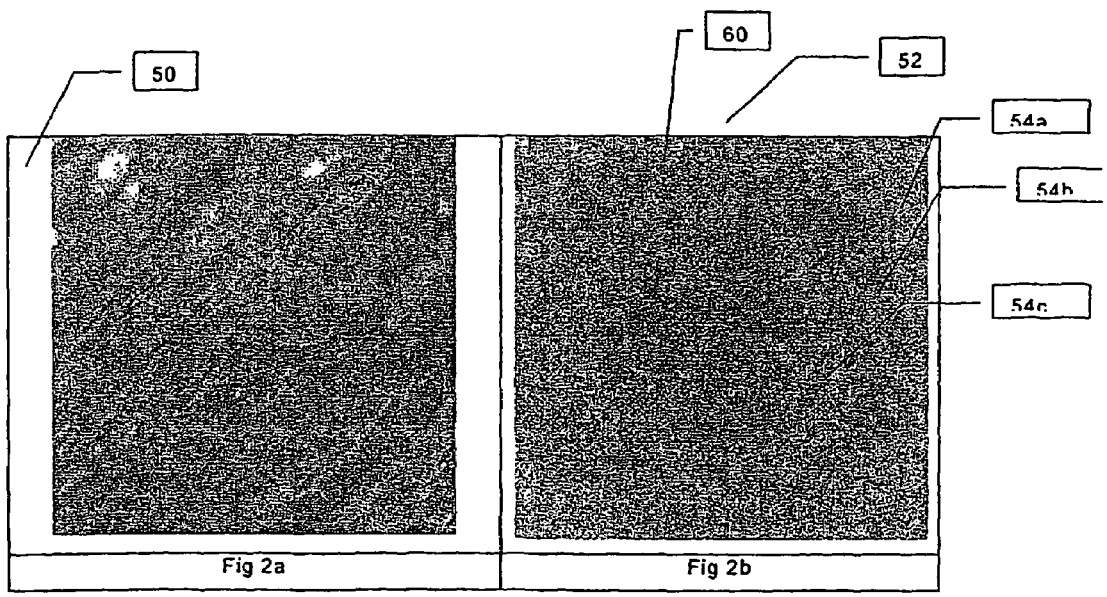
Fig 1
Fig 2a  Fig 2b

METHOD FOR IDENTIFYING BAD PIXEL AGAINST A NON-UNIFORM LANDSCAPE

FIELD AND BACKGROUND OF THE INVENTION

The present invention relates to matrix detectors, and in particular to the real-time identification of bad pixels in such detectors against a non-uniform landscape.

Optical systems based on matrix image sensors or "matrix detectors" are known. Also known are methods of identifying bad or damaged pixels in these matrices. The identifications normally include a factory two-point non-uniformity correction (TPC-NUC). The two-point NUC refers to a test in which a uniform black body image is presented to the detector at two different temperatures. The detector output is measured, and from these measurements one obtains three figures of merit for each picture element (pixel). These three figures of merit are gain (responsivity), level (dark current), and noise. The values of gain, level, and noise should be roughly the same for all the pixels. A pixel that deviates significantly from the others in any of these three figures of merit is considered (tagged) defective (bad) and included in a "bad pixel" table.

Additionally, after the TPC-NUC, there is sometimes performed an on-line, real-time, continuous one-point correction (OPC) in which only the OFFSET is corrected.

This initial tagging of bad or damaged pixels does not assure long-term stable performance of the detector. The matrix may experience during its lifetime deterioration of additional pixels, which need then to be added to the bad pixel table. In other words, the original bad pixel table is unstable in time. Moreover, even when the deviation of bad pixels from "good" pixels is on the order of the temporal noise, the fact that the deviation is constant reflects disadvantageously on the system performance. Detecting such bad pixels includes the steps of a) positioning a uniform black body in front of a static detector, and sampling of a large number of images; b) obtaining gain level and noise figures for each pixel, c) identifying bad pixels that deviate from a mean value by more that a given criterion; and d) adding the identified damaged pixels to the "bad pixel" table. The main problem and disadvantage of this method lies in the need for a uniform black body. Such a body is normally not available under field conditions, and certainly not available during normal operation of the system, for example when the detector is in flight, attached to a body such as a missile.

There is thus a widely recognized need for, and it would be highly advantageous to have, an on-line, real-time, simple, and fast method for identification of bad pixels that appear after the original bad pixel table is formulated.

SUMMARY OF THE INVENTION

The present invention describes a method for on-line, real-time, simple and fast identification of bad pixels that appear after an original bad pixel table is formulated.

According to the present invention there is provided a method for identifying defective pixels in a matrix imaging sensor comprising the steps of moving the matrix sensor in a prescribed motion with respect to a background landscape, acquiring a combined image of the landscape, and identifying bad pixels in the matrix sensor from the combined image, whereby the identification is performed on-line in real-time without necessitating the use of a black body.

According to one feature in the method of the present invention, the step of moving includes rotating the matrix sensor.

According to another feature in the method of the present invention, the step of moving includes translating the matrix sensor in a smooth motion along a circle.

According to yet another feature in the method of the present invention, the matrix sensor resides in a missile homing head.

According to yet another feature in the method of the present invention, the matrix sensor is fixedly attached to the missile homing head, and the step of moving the matrix sensor includes moving the missile homing head.

According to yet another feature in the method of the present invention, the step of identifying bad pixels includes applying a finite impulse response filter on the combined image.

According to yet another feature in the method of the present invention, the filtering is performed with a High Pass filter.

According to the present invention there is provided a system for identifying a bad pixels in a matrix imaging sensor, comprising moving means to move the matrix detector in a prescribed motion that enables the acquisition of a combined landscape image, and image processing means to identify bad pixels in the matrix sensor using the combined image.

According to one feature in the system of the present invention, the matrix sensor is located inside a missile homing head, and wherein the moving means include means to rotate the matrix sensor relative to the homing head.

According to another feature in the system of the present invention, the matrix sensor is fixedly connected to a missile homing head, and wherein the moving means include means to rotate the homing head.

According to yet another feature in the system of the present invention, the image processing means include a finite impulse response filter for filtering the combined image.

According to yet another feature in the system of the present invention, the impulse response filter is a high pass filter.

BRIEF DESCRIPTION OF THE DRAWINGS

The invention is herein described, by way of example only, with reference to the accompanying drawings, wherein:

FIG. 1 shows the principle of the method of the present invention;

FIG. 2 shows in (a) a single image of a landscape, and in (b) a combined image that results from the averaging of many rotated landscapes (a);

DESCRIPTION OF THE PREFERRED EMBODIMENTS

Figure 3:
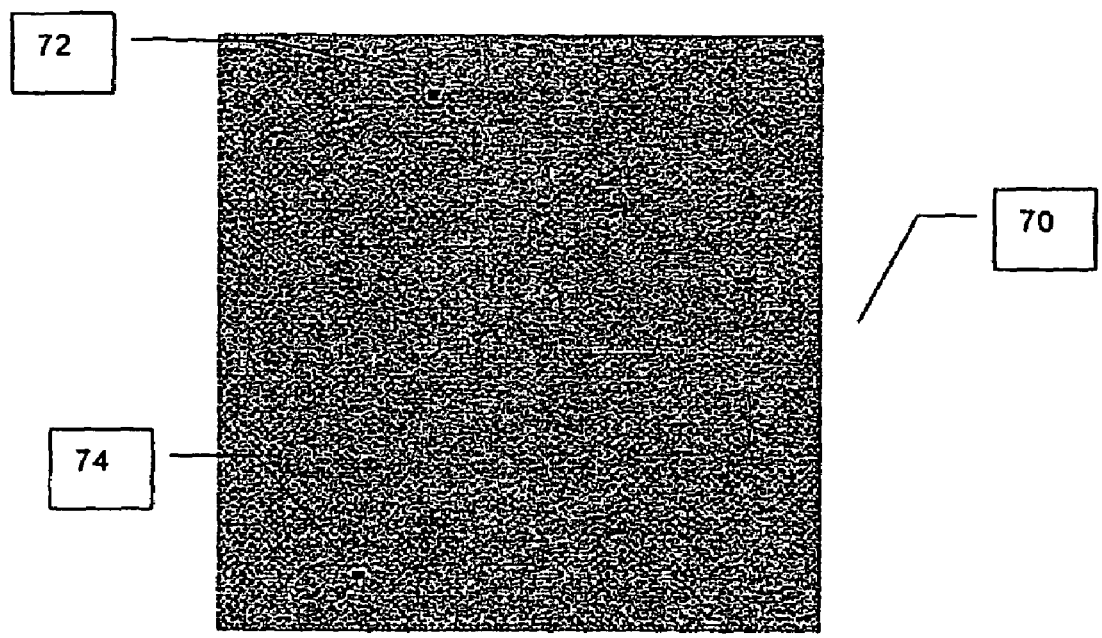
FIG. 3 shows a filtered combined image with clearly delineated bad pixels.

The present invention is of a method for on-line, real time, simple and fast identification of bad pixels that appear after an original bad pixel table is formulated. The principles and operation of the method according to the present invention may be better understood with reference to the drawings and the accompanying description.

FIG. 1 shows the principle of the method. The matrix detector (not shown) viewing a background landscape (or simply "background") 10 is moved in a prescribed motion around a center axis 12. The prescribed motion may be rotation, translation along a circle, etc. Preferably, the motion is simple rotation. If the detector rotation is rapid relative to changes in the landscape, axis 12 points approximately to the same feature in the landscape. In a particular exemplary case of a missile homing head, the detector is typically located in the homing head, and rotating the detector is equivalent to rotating the missile head (see system description below).

Missile homing heads always have a built-in mechanism for moving the head in any prescribed motion within some range (called field of regard), and which can therefore perform the mentioned rotation. The homing head may also move in other types of motions, such as a translational motion along a circle. The necessary conditions for the motion are that it is smooth and continuous, i.e. no jerky motion or stopping are allowed. It should be clear to anyone knowledgeable in the art that any type of motion that fulfils these conditions and renders the required results is considered within the scope of the invention. The generic term of "rotation" will be henceforth used to mean all these types of motion.

Each pixel 16 of the matrix rotates around axis 12 on a radius R, covering over a full cycle a "ring" of landscape given by $2\pi R dR$. This slowly moving landscape is sampled in a large number of cycles, providing a large number of images that are then overlaid (superposed) to one combined image. Note that because the detector rotation is fast relative to the movement of the landscape, the set of images forming the combined image is essentially of the same landscape. As a result, the point in the combined image seen by the center matrix element of the detector relates approximately the same feature in all images of the set. The method works even if the center point is not the same feature in each landscape image. In the combined image, each pixel represents the average value of that matrix element over the ring. In other words, the pixel assumes the average value of all values covered by the ring. FIG. 2a shows a single image of a landscape 50, while FIG. 2b shows a combined image 52, which results from the averaging of many rotated landscapes 50. The combined image appears as a series of concentric rings 54 a, b, c, . . . of various gray shades, where the variation in intensity of all pixels in a single ring is no larger than the basic pixel-to-pixel variation. In essence, rotating the scene averages out the impact of individual landscape bright spots, achieving in effect a uniform background, or at least a background uniform along concentric rings, and varying slowly in the radial direction, as clearly seen in the pictures.

The typical number of images required by the method is on the order of 100; however, this number depends on performance: the more images one uses, the smoother the averaged image comes out, resulting in a smaller probability of misidentifying a bad pixel. On the other hand, increasing the number of images increases the time required to complete the procedure, which is a dead-time as far as normal use of the system is concerned. The rotation speed should preferably be such that the system would undergo several complete rotations during this time.

In FIG. 2b, one can already see "different" pixels such as a pixel 60 that differ significantly from same radius (on the same ring) neighboring pixels. Such different pixels are most preferably distinguished clearly from other "normal" pixels by applying a finite impulse response filter on the combined landscape image to provide a filtered image. Such filtering is preferably done with a high band pass (or simply "High Pass") or similar filter. In the example shown in FIG. 3, image 52 was filtered using a High Pass vertical FIR filter with coefficients −1, +2, −1. The filtering yielded a filtered image 70 with clearly delineated bad pixels 72 and 74, which were significantly different from the others. Clearly, and within the scope of the invention, the numerical filter used may be different from the one specified above (with coefficients −1, +2, −1 along a row or column). As mentioned, this filter is preferably a High Pass filter in order to accentuate the deviation of the different pixel from its neighbors, while not being affected from slow variations perpendicular to the rings. It is well known that High Pass filters may be realized in many ways, as pointed out in standard engineering textbooks, and all the various ways of implementing them are considered within the scope of the present invention.

In the exemplary case of a missile that always includes known image acquisition means, image processing means, and computing means, the data acquisition and processing mentioned above are preferably done with these already existing means.

The distributions of both the level and the noise, after applying the High Pass filter, closely follow Gaussian statistics (i.e. normal, bell-shaped, etc.). Detecting deviations from a normal distribution is a standard textbook procedure. One typically starts by finding the average and standard deviation of the population, then proceeds by calling a pixel defective if the pixel value deviates from the average by more than a certain number of standard deviations. This 'certain number' (typically 3-5) depends on the penalty on making each of the two types of errors: error of omission or error of commission, i.e. designating a bad pixel as good, or designating a good pixel as bad. This is an engineering problem with well-known solutions, depending on the requirements from the particular system at hand.

Figure 4:
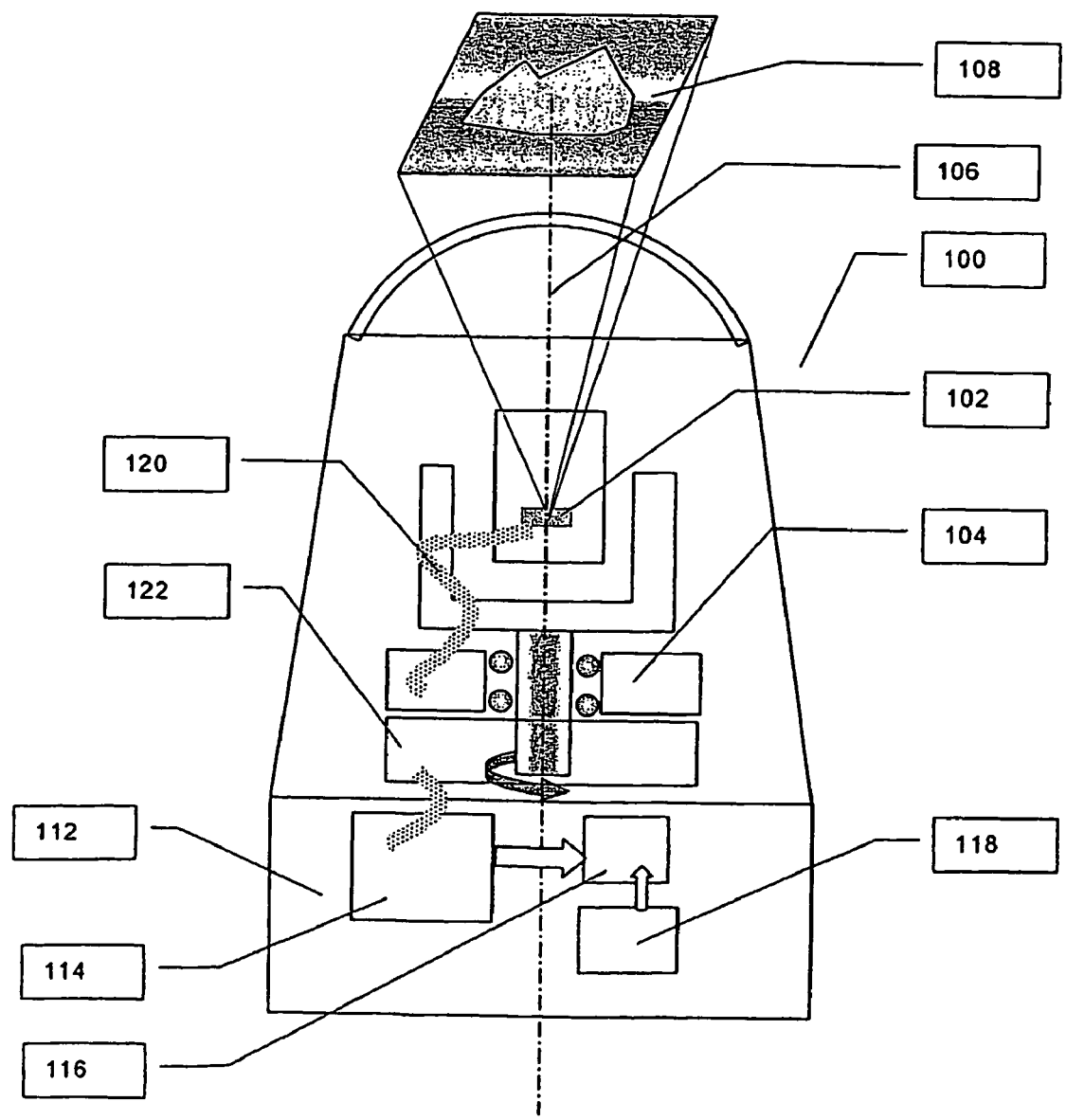
FIG. 4 shows a schematic block diagram of a preferred embodiment system used to implement the method of the present invention

In terms of a system that can be used to perform the on-line, real-time, simple and fast method for identification of bad pixels according to the present invention, any system that can acquire, through a rotating matrix detector, an overlaid combined image of a landscape, process that image, and apply the preferred filtering, falls within the scope of the present invention. A schematic description of a preferred embodiment of such a system, as applied for example in a homing head of a missile, is shown in FIG. 4. A homing seeker head 100 comprises a matrix detector 102 that has a plurality of pixels, potentially among them one or more bad pixels as defined above. Matrix detector 102, rotated by rotating means 104, rotates around an axis 106, while looking at a landscape 108. The rotation of the detector is fast relative to changes in the landscape. For example, if the detector resides in a missile homing head, and the missile is fixedly attached to a maneuvering aircraft, the turns and rolls of the aircraft cause the missile length axis to point at a changing landscape. However, if the detector rotation is much faster than the relative movement of the aircraft vs the landscape (e.g. the landscape is far, and the detector acquisition time for the combined image is very short) the detector looks essentially at the same landscape during the image acquisition. Clearly, detector 102 may be fixedly attached to homing head 100, in which case the rotating means rotates the homing head itself, as explained above. Alternatively, detector 102 may be flexibly attached to the homing head, driven independently of the homing head by means 104. Homing head 100 further comprises image processing means 112, which typically include a microprocessor 114, a storage means 116, and filtering means 118, preferably a High Pass filter. The information acquired by detector 102 is transferred to image processing means 112 by a fixed electrical harness 120 and trough a slip ring assembly 122 (that allows a rotational movement between both parts). Alternatively, the information may be transferred wirelessly from a transmitter attached to detector 102 to a receiver attached to means 112. Microprocessor 114, storage means 116 and filtering means 118 cooperatively process the information by well-known image processing techniques.

In summary, the present invention provides an on-line, real-time, simple and fast method for identification of bad pixels that appear after the original bad pixel table is formulated. In contrast with existing competing methods, the method of the present invention does not require a uniform black body, and is therefore particularly advantageous and useful in field conditions, e.g. for missiles in flight.

While the invention has been described with respect to a limited number of embodiments, it will be appreciated that many variations, modifications and other applications of the invention may be made.

What is claimed is:

1. A method for identifying defective pixels in a matrix imaging sensor during use of the matrix imaging sensor to acquire images of a landscape, the method comprising the steps of:
   a. while continuing to sample images of the landscape, moving the matrix sensor in a defined motion;
   b. generating a combined image by combining images sampled by the matrix sensor during said defined motion such that the value of each pixel of the combined image corresponds to an average value of the image data sampled by that pixel while pointing in different directions during said defined motion, thereby averaging out features of the landscape to generate a uniform or slowly varying background; and
   c. processing said combined image so as to detect bad pixels in the matrix sensor.

2. The method of claim 1, wherein the step of moving includes rotating the matrix sensor.

3. The method of claim 2, wherein the matrix sensor is rotated about an axis passing through a central region of the field of view of the matrix sensor.

4. The method of claim 2, wherein the matrix sensor is rotated through a plurality of revolutions.

5. The method of claim 1, wherein the step of moving includes translating the matrix sensor in a smooth motion along a circle.

6. The method of claim 1, wherein the matrix sensor resides in a missile homing head.

7. The method of claim 6, wherein the matrix sensor is fixedly attached to the missile homing head, and wherein the step of moving the matrix sensor includes moving the missile homing head.

8. The method of claim 1, wherein the step of processing said combined image so as to detect had pixels includes applying a finite impulse response filter on the combined image.

9. The method of claim 8, wherein the filtering is performed with a High Pass filter.

10. The method of claim 1, wherein the set of images sampled by the matrix sensor during said defined motion includes about 100 images.

11. The method of claim 1, wherein said defined motion is such that all pixels within each of a plurality of groups of pixels of said matrix sensor sample image data along a common locus of points within the landscape.

12. A system for identifying a bad pixels in a matrix imaging sensor, comprising:
   a. moving means to move the matrix detector in a defined motion; and
   b. image processing means configured to generate a combined image by combining images sampled by the matrix sensor during said defined motion such that the value of each pixel in the combined image corresponds to an average value of the image data sampled by that pixel while pointing in different directions during the defined motion, thereby averaging out features of the landscape to generate a uniform or slowly varying background, and to process said combined image so as to detect bad pixels of the matrix sensor.

13. The system of claim 12, wherein the matrix sensor is located inside a missile homing head, and wherein the moving means include means to rotate the matrix sensor relative to the homing head.

14. The system of claim 12, wherein the matrix sensor is fixedly connected to a missile homing head, and wherein the moving means include means to rotate the homing head.

15. The system of claim 12, wherein the image processing means include a finite impulse response filter for filtering the combined image.

16. The system of claim 15, wherein the finite impulse response filter is a high pass filter.

17. The system of claim 12, wherein the set of images sampled by the matrix sensor during said defined motion includes about 100 images.

* * * * *

UNITED STATES PATENT AND TRADEMARK OFFICE
CERTIFICATE OF CORRECTION

PATENT NO. : 7,471,311 B2  Page 1 of 1
APPLICATION NO. : 10/557805
DATED : December 30, 2008
INVENTOR(S) : Dov Tibi et al.

It is certified that error appears in the above-identified patent and that said Letters Patent is hereby corrected as shown below:

Claim 12 (a), column 6 should be corrected as follows:

Line 16: change
-- matrix detector --
to
"matrix sensor"

Signed and Sealed this

Thirty-first Day of March, 2009

JOHN DOLL
*Acting Director of the United States Patent and Trademark Office*